June 10, 1947.  E. S. WEITE  2,421,821
HAND OPERATED POTATO SEED PLANTER
Filed Dec. 28, 1943
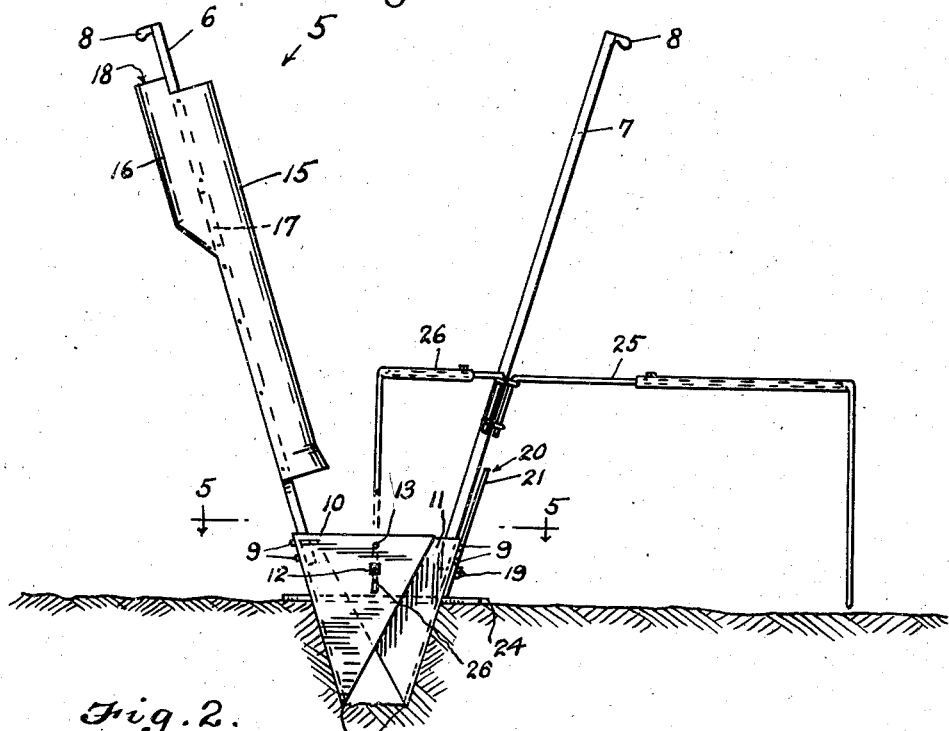
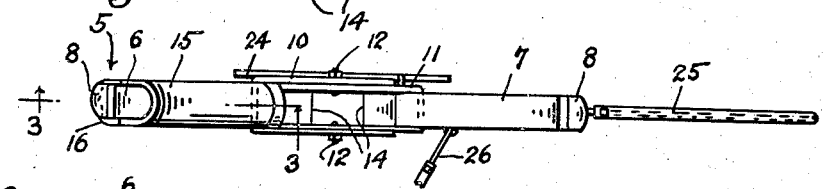
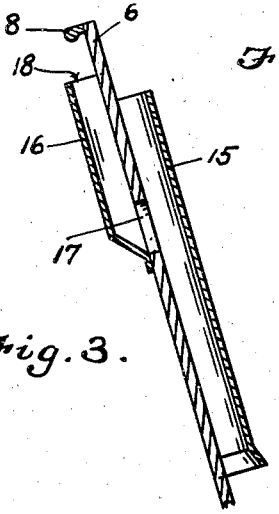
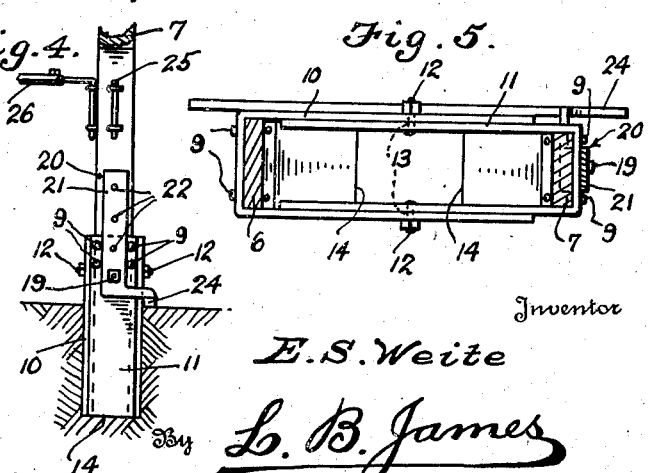
Inventor
E. S. Weite
By L. B. James
Attorney Patented June 10, 1947

2,421,821

UNITED STATES PATENT OFFICE 2,421,821

HAND OPERATED POTATO SEED PLANTER

Ernest S. Weite, Wells, Minn.

Application December 28, 1943, Serial No. 515,954

1 Claim. (Cl. 111—92)

This invention relates to planters and more particularly potato seed planters.

One of the important objects of this invention resides in the provision of a potato seed planter adapted to permit planting of the potato seed quickly and while the planter remains in a walking position.

Another object of this invention resides in the provision of a hand operated potato planter adapted to form a hole in the ground at a predetermined depth for reception of the potato seed.

A further object of this invention resides in the provision of a hand operated potato planter adapted to be forced into the ground by the foot of the operator thereof.

A still further object of this invention resides in the provision of a hand operated potato planter adapted to be adjusted to form potato seed receiving holes of different sizes.

In addition to the aforesaid objects, this invention resides the provision of a hand operated potato planter adapted to space the potato hills in rows of predetermined widths.

Aside from the foregoing objects, this invention resides in the provision of a hand operated potato planter adapted to convey the potato seeds from the hand of the operator thereof into the hole forming shoe subsequent to forming each hole in the ground.

Among the objects heretofore set forth, this invention resides in the particular construction of the potato seed conveying chute and handle carrying the same.

With these and other objects in view, this invention resides in certain novel features of construction and arrangement of elements to be hereinafter more particularly set forth in the specification, illustrated in the accompanying drawing and pointed out in the appended claim, and, while this disclosure depicts my present conception of the invention, the right is reserved to resort to such changes in construction and arrangement of elements as come within the spirit of the invention.

In the accompanying drawing forming a part of this application;

Fig. 1 is a front view of a potato planter constructed in accordance with this invention.

Fig. 2 is a plan view thereof.

Fig. 3 is a vertical sectional view taken approximately on line 3—3 of Fig. 2.

Fig. 4 is a side view of a portion of the potato planter.

Fig. 5 is an enlarged horizontal sectional view taken approximately on line 5—5 of Fig. 1.

In the present illustration of this invention the numeral 5 designates, in general, a hand operated potato planter which consists of handles 6 and 7 having hand gripping knobs 8 secured to or formed at their upper ends.

Secured to the lower ends of the handles as by bolts 9 or the like are substantially U-shape steel boots 10 and 11. Said boots are of substantially V-shape configuration in side elevation and have their open ends disposed in opposed disposition with their sides pivotally secured together by bolts 12 or the like passing through selected holes 13 to permit adjustment of the boots relative to one another so as to form potato receiving holes of different sizes at their inner ends 14. The aforesaid boots form a hopper to receive potato seeds dropped therein and also means to direct the potato seed to the bases of the holes formed thereby.

Secured on the inner side of the handle 6 and in alignment with the aforesaid hopper is an elongated chute 15 which communicates with an outer chute 16 secured to the outer side of said handle through an enlarged hole 17 formed in the handle. Said outer chute is open at its upper end 18 to receive potato seeds delivered therein from the hand of the operator.

Adjustably secured to the handle 7 as by a bolt 19 or the like is a ground engaging gage 20 which preferably consists of a standard 21 provided with bolt receiving apertures 22 to accommodate the bolt 19 to permit adjustment of the gage relative to the leading or inner end of the hopper. Said gage is provided with a ground engaging foot 24 for limiting the thrust of the hopper into the ground when pressed by the foot of the operator resting on or disposed on the upper edges thereof immediately above the ground engaging end thereof.

Suitably secured to the outer side and edge of the handle 7 are adjustable gage rods 25 and 26, the former of which is adapted to guide the operator down a row parallel to a straight line or previously planted row, while the latter is adapted to form marks ahead of the operator to permit planting of the seeds in equally spaced hills.

With this invention fully described, it is manifest that a hand operated potato seed planter is provided which will afford the maximum comfort to the operator while planting potato seeds throughout a field and, through the simplicity of the assemblage of elements involved, the same can be manufactured cheaply and sold at a reasonable cost.

Having thus described my invention, what I claim and desire to protect by Letters Patent is:

A hand operated potato seed planter comprising, a pair of handles, substantially U-shape boots secured to the lower ends of the handles with their open ends disposed in opposed relation and their sides pivotally connected together adjacent their upper edges at points permitting the upper outer edges of the inner boot to abut the opposed handle when the boots are in open position, said boots being of substantially inverted V-shape in side elevation, an inner chute secured to the sides of one of the handles and overlying the inner surface thereof in spaced relation thereto with its discharge end disposed in alignment with that area between the boots, an outer chute having an open upper end secured to the sides of the aforesaid handle and overlying the outer surface of the same in spaced relation thereto with its lower end communicating with the inner chute through an opening in said handle and its end disposed in close relation to the upper end of the inner chute, and hand grips secured to the handles at their upper ends and extending outer thereof, that grip on the chute carrying handle being disposed over and adjacent the upper end of the outer chute.

ERNEST S. WEITE.

REFERENCES CITED

The following references are of record in the file of this patent:

UNITED STATES PATENTS

| Number | Name | Date |
|---|---|---|
| 557,483 | Bryson | Mar. 31, 1896 |
| 290,574 | Gray | Dec. 18, 1883 |
| 537,525 | Gasser | Apr. 16, 1895 |
| 1,358,587 | Shaffer | Nov. 9, 1920 |
| 556,134 | Choate | Mar. 10, 1896 |
| 1,439,601 | Boop | Dec. 19, 1922 |
| 646,554 | Johnson | Apr. 3, 1900 |

FOREIGN PATENTS

| Number | Country | Date |
|---|---|---|
| 115,715 | Great Britain | May 23, 1918 |